United States Patent
Ng et al.

(10) Patent No.: US 8,159,121 B2
(45) Date of Patent: Apr. 17, 2012

(54) FIELD EFFECT ELECTRON EMITTING APPARATUS

(75) Inventors: Wei Beng Ng, Singapore (SG); Takehisa Ishida, Singapore (SG)

(73) Assignee: Sony Corporation, Tokyo (JP)

( * ) Notice: Subject to any disclaimer, the term of this patent is extended or adjusted under 35 U.S.C. 154(b) by 608 days.

(21) Appl. No.: 12/274,047

(22) Filed: Nov. 19, 2008

(65) Prior Publication Data

US 2009/0225532 A1    Sep. 10, 2009

(30) Foreign Application Priority Data

Mar. 5, 2008   (SG) .............................. 200801946-5

(51) Int. Cl.
    *H01J 17/49*   (2006.01)
(52) U.S. Cl. ....................................... 313/495; 313/497
(58) Field of Classification Search ........... 313/495–497
    See application file for complete search history.

(56) References Cited

U.S. PATENT DOCUMENTS

| 5,584,739 A | 12/1996 | Itoh et al. |
| 6,741,019 B1 * | 5/2004 | Filas et al. ................. 313/355 |

FOREIGN PATENT DOCUMENTS

| SG | 140484 | 3/2008 |
| SG | 148066 | 12/2008 |

* cited by examiner

*Primary Examiner* — Anne Hines
(74) *Attorney, Agent, or Firm* — Oblon, Spivak, McClelland, Maier & Neustadt, L.L.P.

(57) ABSTRACT

A field effect electron emitting apparatus comprising a substrate, a plurality of wires embedded in the substrate, at least a portion of each wire being exposed from the substrate and extending generally perpendicularly therefrom and including magnetic material, wherein the average wire spacing is less than 30 μm, the average spacing height ratio is between 1 and 3 and the average wire aspect ratio is greater than 3. Also a method of manufacturing an electron emitting apparatus, a field effect display having such a field effect electron emitting apparatus, an illumination apparatus having such a field effect electron emitting apparatus, and a backlight apparatus for a liquid crystal display having such a field effect electron emitting apparatus.

13 Claims, 4 Drawing Sheets

FIELD EFFECT ELECTRON EMITTING APPARATUS

FIELD OF THE INVENTION

This invention relates to a field effect electron emitting apparatus, a method of manufacturing an electron emitting apparatus, a field effect display having such a field effect electron emitting apparatus, an illumination apparatus having such a field effect electron emitting apparatus, and a backlight apparatus for a liquid crystal display having such a field effect electron emitting apparatus, and relates particularly though not solely to the standing array assembly of micro-sized magnetic wires by magnetic alignment of an aqueous wire dispersion and controlling the inter-spacing and/or singularity of such standing wires on the substrate.

BACKGROUND OF INVENTION

Field emission technology, which is promising for the backlighting of thin film transistor-liquid crystal displays and the next generation of flat panel displays, relies on the efficient emission of electrons from sharp pointed conductive tips under electric field magnification. One-dimensional materials such as micro- and nano-sized wires are well suited as such emitters due to their elongated shape and pointed tip. The easy and direct patterning of these small sized wires on the surface of an electrode to form standing array of pointed tip emitters may be important for their application in field emission devices.

Several methods have been proposed and experimented to manipulate the free form of these wires. However, these methods may only be suited for the in-plane alignment of wires rather than the out-of-plane or perpendicular configuration required for field emission.

It has been proposed that efficiency of field emission may dependent on dimensional parameters of emitter assembly such as spacing/height ratio and density. Accordingly, there remains a need in the technique of alignment to provide standing assembly of micro-sized magnetic wires having desirable field emission properties, optimal spatial distribution and/or singularity.

SUMMARY OF THE INVENTION

In general terms, the present invention proposes in a first aspect that in a field effect electron emitting apparatus using wire electron emitters, each wire is made of a magnetic material; the average wire spacing is less than 30 um, the spacing/height ratio is between 1 and 3 and the average wire aspect ratio is greater than 3.

This aspect provides the advantage that if a magnetic field is applied to the wires perpendicular to the substrate during the fabrication process of the electron emitting apparatus, the magnetic field may align the wires perpendicular to a substrate. Conventionally, Molybdenum (Mo) is used to form an emitter in Spindt-type FEDs and carbon is used in CNT-type FEDs. Neither is a magnetic material.

A second aspect of the invention proposes in general terms a fabrication process for a field effect electron emitting apparatus which includes a step of attaching wires from a solution having a concentration no greater than $4 \times 10^8$/ml to a substrate in the presence of a magnetic field perpendicular to the substrate, and that the wires are made of a magnetic material, such that they are aligned by the field.

Either aspect of the invention may provide the advantage that it is easier to control the density and the singularity of the wires on the substrate, so that the fabricated electron emitter has a lower threshold voltage of electron emission.

Typically, the wires are attached at the same time that a metallic material is deposited on the substrate using a plating solution, by an electrochemical or non-electric plating process. The magnetic wires are dispersed in the plating solution, aligned with the magnetic field, so they are incorporated in the electrochemically or chemically deposited metallic film maintaining their orientation almost perpendicular to the substrate. By controlling the concentration of the dispersion optimum inter-spacing and singularity can be reliably obtained. For example, a high nickel wire concentration above $3 \times 10^8$/ml led to an agglomeration of standing wires while a low concentration of $7.8 \times 10^7$/ml led to a low density of standing wires with singularity and inter-spacing of ~25 um. Further experiment and investigation indicated that a wire concentration between $1 \times 10^7$/ml and $4 \times 10^8$/ml may produce an acceptable arrangement of wire arrays for efficient field emission in the configuration according to the exemplary embodiment. Hence dimensional parameters such as spacing/height ratio of standing wires assembly used in field emission devices may be controlled by such a method.

In a first specific expression of the invention, there is provided a field effect electron emitting apparatus as claimed in claim 1.

In a second specific expression of the invention, there is provided a method of manufacturing an electron emitting apparatus as claimed in claim 9.

In a third specific expression of the invention, there is provided a field effect display as claimed in claim 8.

In a fourth specific expression of the invention, there is provided an illumination apparatus as claimed in claim 9.

In a fifth specific expression of the invention, there is provided a backlight apparatus for a liquid crystal display as claimed in claim 10.

BRIEF DESCRIPTION OF THE FIGURES

For a more complete understanding of the present invention, and the advantages thereof, reference is now made to the following descriptions taken in conjunction with the accompanying drawings, in which.

DETAILED DESCRIPTION OF THE EMBODIMENTS

Figure 1:
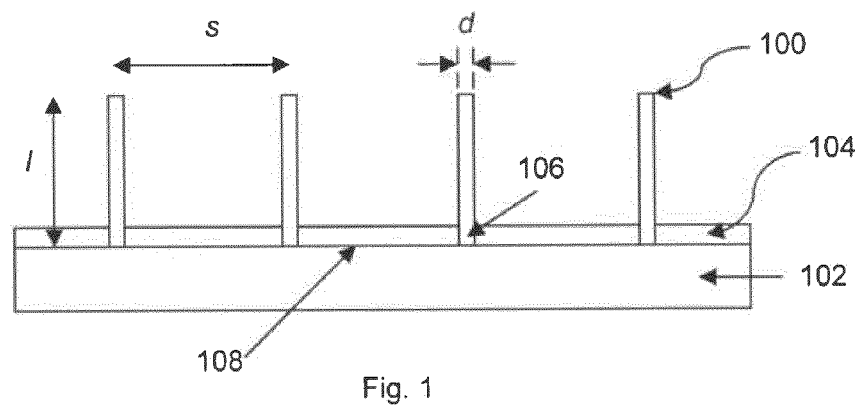
FIG. 1 is a schematic diagram showing the dimensional parameters related to a field emitter array.

An exemplary embodiment includes a standing array of wires 100, of a soft magnetic material, of micron sized diameter d and length l with inter-spacing distance s as illustrated in FIG. 1. The array of wires 100 are fixed in a standing configuration on a substrate 102 by a thin anchoring film 104. The bottom 106 of each wire is embedded within the anchoring film 104 thereby fixing each wire to the substrate 102. The anchoring film 104 may be electrodeposited simultaneously with magnetic alignment of the array of wires 100 suspended in an aqueous dispersion. If the anchoring film 104 is electrodeposited, the substrate 102 maybe either conductive, or if it is a nonconductive substrate, a conductive seed layer on the side 108 of the substrate, where the array of wires 100 are to be located.

It has been proposed that field emission efficiency may be controlled by the wire spacing to wire length ratio, spacing/height ratio. For example, to achieve a ratio of 2 for maximum efficiency using wires of length 10 um may require a inter-spacing of 20 um, while an inter-spacing of 10 um may be required for wires of length 5 um if a ratio of 2 is to be achieved. The inter-spacing of standing wires may in turn controlled by the number of wires per unit volume of the dispersion. In general, lower concentration of wires in the dispersion may gives rise to larger wire inter-spacing s, while a higher wire concentration in the dispersion results in a smaller wire inter-spacing. As a consequence, field emission efficiency of field emitter fabricated by the exemplary embodiment may be reliably controlled by varying wire concentration in the dispersion, since emission efficiency is dependent on the spacing/height ratio. For example, the spacing/height ratio may be between 1 and 3.

Another performance parameters for an emitter array, is current density. While efficiency may be dependent on spacing/height ratio, current density may be dependent on the density of individual emitters. A dense array of emitters delivers may higher current density as compared to one with sparsely distributed emitters. As a result, in order to achieve a high efficiency without losing current density, there may be a upper limit to the length of emitter, hence the length of the standing wires. For example, if the length of wires is 20 um, in order to achieve a spacing/height ratio of 2 for maximum efficiency, a spacing of 40 um may be required. However, this may lead to a low current density since density of emitters is low. If the length is 10 um, a smaller spacing of 20 um may be required. The density of wires in the latter case is higher, so the current density is also higher compared to the former case. For example, the average spacing may be less than 30 um in order to achieve a spacing height ratio of less than 3. In addition to the above consideration, the length is preferably less than 10 um since longer wires will have a higher chaining effect leading to large agglomerates.

While there may be an upper limit to the length of wires due to current density consideration, there may also a lower limit in consideration of the shape of the wires. The magnetic alignment method may be dependent on the shape of the magnetic wires. The wires may have to be sufficiently elongated for a successful magnetic alignment. As a result, with respect to the diameter of the wires, the length of wires may have a minimum length so as to achieve a shape effect during the magnetic alignment process.

In one example, a field emitter array was fabricated with a standing array of nickel (Ni) wires that were electrodeposited in anodized aluminium oxide templates. Nickel wires, each of ~300 nm in diameter and ~10 um in length, were dispersed in an aqueous solution comprising 0.1 mol/dm$^3$ NiSO$_4$.6H$_2$O and 0.3 g/L of sodium dodecyl sulphate which acted as a surfactant for the effective and stable dispersion of the wires in the solution. Concentration of the surfactant may be kept below a desired level to avoid solid precipitate in the dispersion. However, a very low concentration of the surfactant may not be effective in achieving a stable suspension of the wires in solution. The dispersion was ultrasonically treated for 15 min before use. Magnetic alignment of the suspended Ni wires in the Ni solution was carried out on glass disc substrate (diameter 12 mm, thickness 0.3 mm) sputtered with ~200 nm Au seed layer. A permanent disc magnet was attached to the back of the glass substrate serving as the source of external magnetic flux. As seen in FIG. 2a, the disc magnet 200 has a diameter (D) of 12 mm with 0.5 mm thickness (L) with a through-thickness magnetization Br of 11.99 kG. According to a simulation, the disc magnet 200 has a magnetic strength profile with central distance (X) as shown in FIG. 2b. In other words, the magnetic field strength right at the center of the glass substrate was ~480 G which reduces with distance from the centre.

The glass substrate with an Au seed layer and magnetic backing was connected as an cathode while platinum wire was used as an anode. Ag/KCl was again used as the reference electrode. In-situ direct current electrodeposition of a Ni film on the glass substrate was carried out at 1.95 A for 1 min during the magnetic alignment and attachment of the Ni wires to the substrate surface. Hence the Ni solution was serving both as the suspension medium for the Ni wires as well as the electrolyte for electroplating of the Ni film on the substrate. The purpose of the Ni film, denoted as the anchoring film, was to lock the Ni wires in place even after removal of the magnet backing after process.

Figure 3:
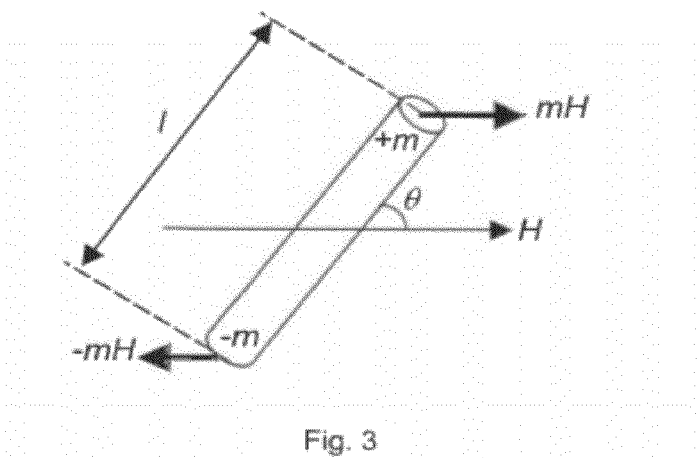
FIG. 3 is an illustration of a magnetic wire under the action of a torque in a uniform magnetic field.

When magnetic wires are brought to close vicinity of a magnetic field, two phenomena may occur. The attraction of wires towards the magnet, and the alignment of the wires along the magnetic flux. The dipoles of ferromagnetic wires in solution only align along the easy axis as a result of the shape anisotropy. Alignment parallel to the applied magnetic field results from the torque arising from the magnetic moment produced in suspended wires is given by Equation (1):

$$T = mLH \sin \theta \qquad (1)$$

where m is the pole strength, L is the wire length, H is the applied magnetic field and θ is the angle between the wire length and direction of magnetic field, as illustrated in FIG. 3.

Figure 2:
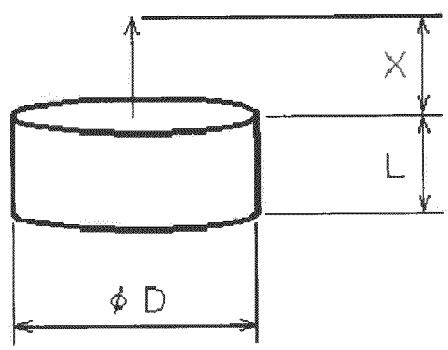
FIG. 2 is a graph showing the magnetic field strength profile of the magnet backing for the magnetic alignment process.
Figure 2:
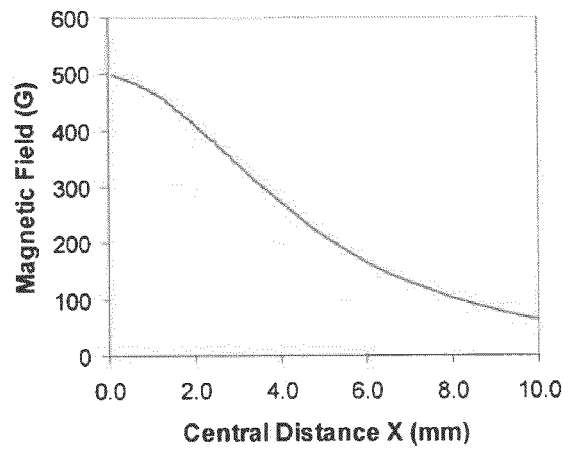
Figure 4:
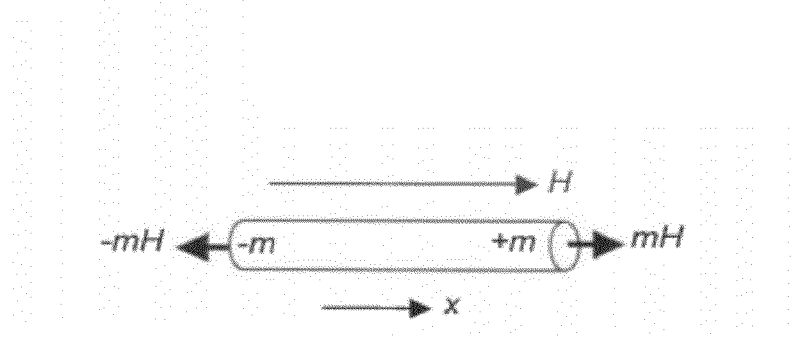
FIG. 4 is an illustration of a magnetic wire under the action of a translational force in a gradient magnetic field.
Figure 5:
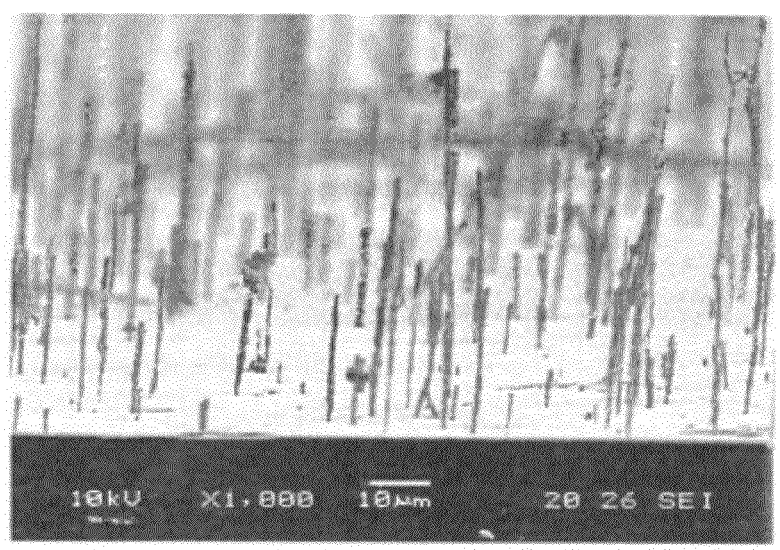
FIG. 5 is a scanning image microscopic (SEM) image showing a typical standing assembly of wires by the magnetic alignment process.

While magnetic alignment of the wires is triggered by a torque, the attraction of the wires by the magnet involves a translational force as illustrated in FIG. 4. The translational force, given in Equation (2):

$$F_x = mL \frac{\partial H}{\partial x} \qquad (2)$$

acts on the wires because of the gradient in magnetic field as expected from the magnetic field profile as simulated in FIG. 2b. Based on the above working mechanism, a typical alignment of Ni wires was achieved as shown by the scanning electron microscope (SEM) image as shown in FIG. 5. It was evident that a magnetic field strength of ~480 G (from FIG. 2) near to the central region of the substrate surface was sufficient to achieve a rather uniform overall alignment of the wires. The Ni wires had an average diameter of ~300 nm and were locked in standing position even after the removal of the magnet backing by a thin Ni base film at the foot of the wires. In addition, the locking of the wires by the base film was strong enough to withstand subsequent processing steps such as physical handling, washing and vacuum suction for observation under the SEM.

As suggested by the torque equation (2), the direct assembly of magnetic wires by a magnetic field may be dependent on the strength of the magnetic field and the aspect ratio, hence the length of the wires. Given a sufficiently strong magnetic field, a longer wire may be more easily aligned than a short wire. However, long wires lead to a parasitic effect of chaining of ferromagnetic wires which was evident in FIG. 5 with some extended chain length over 50 um, even though the original wires were ~10 um to start with. The chaining effect, as described as a function of inter-wire distance, viscous drag, wire dimensions and magnetization, may be a consequence of wire-wire magnetic dipole interactions that dominate in solution. The effect may be reduced by a lower concentration of wires in the dispersion since there would be less chance for wire-wire interaction.

Figure 6:
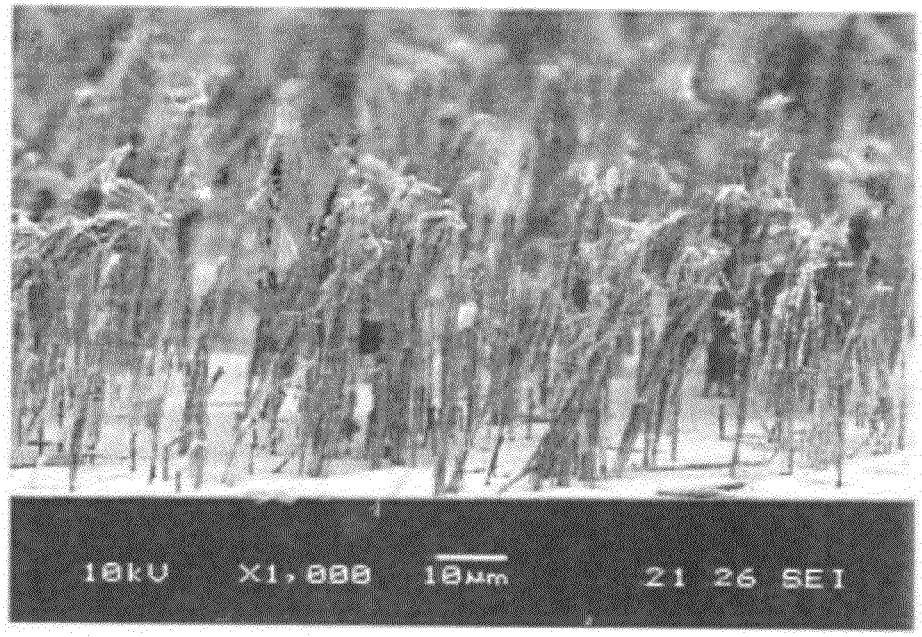
FIG. 6 is a scanning image microscopic (SEM) image showing magnetically aligned nickel wires using ~$3.1 \times 10^8$/ml of wire concentration in nickel solution.
Figure 7:
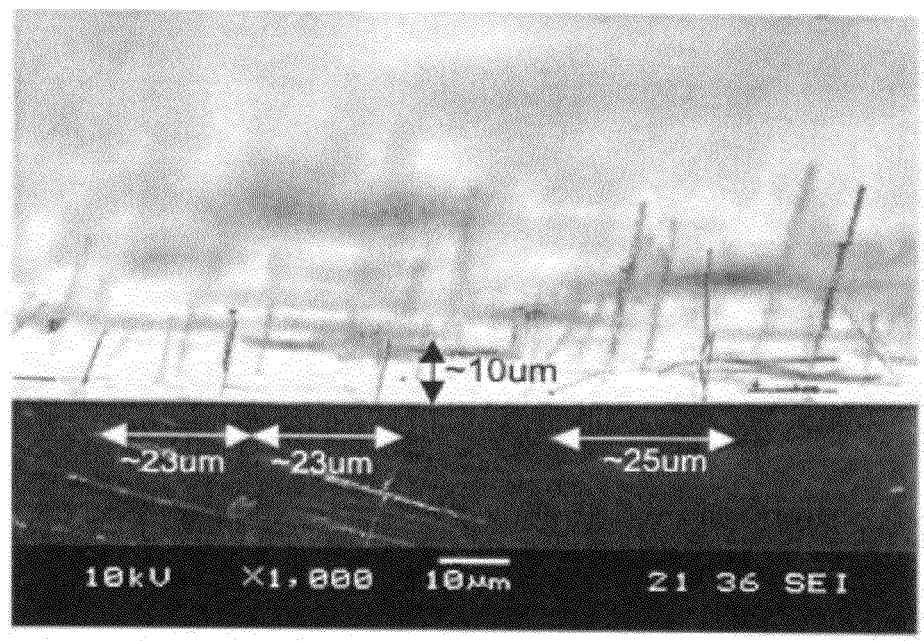
FIG. 7 is a scanning image microscopic (SEM) image showing magnetically aligned nickel wires using ~$7.8 \times 10^7$/ml of wire concentration in nickel solution.
Figure 9:
FIG. 9 is an illustration of the head-tail interaction between wires in the wire dispersion.

FIG. 6 shows the result by magnetic aligning a wire dispersion containing a high concentration of wire at ~3.1×10$^8$/ml. There was a significant amount of chaining effect since the height of standing arrays was well above 50 um. The chaining effect may be a head-tail interaction as illustrated in FIG. 9 by reducing the wire concentration to ~7.8×10$^7$/ml the result is shown in FIG. 7. A much reduced density of wires was observed with much less chaining effect.

Figure 8:
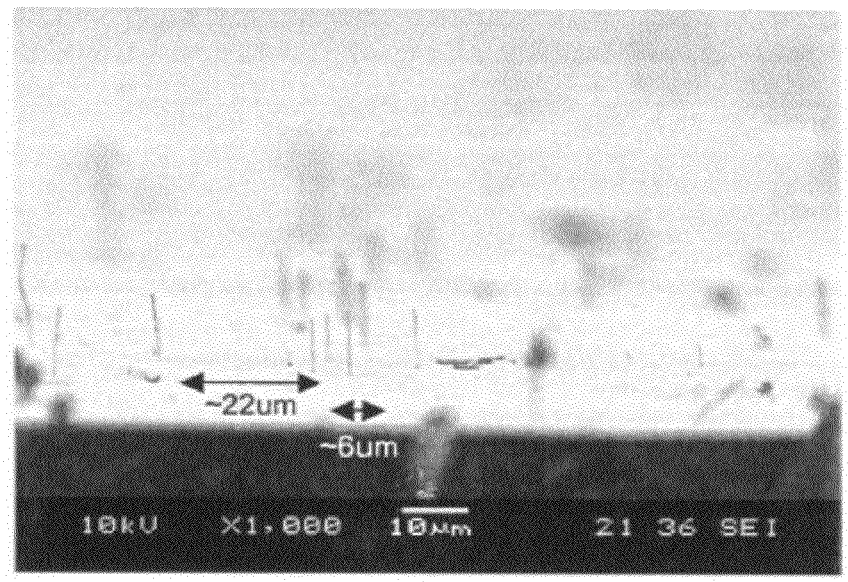
FIG. 8 is a scanning image microscopic (SEM) image showing magnetically aligned nickel wires using ~$3.9 \times 10^7$/ml of wire concentration in nickel solution.

Large aggregates are also apparent in FIG. 6 which may be attributed to the entanglement or agglomeration of the wires before the alignment process. However, under the influence of the strong magnetic flux, these large aggregates, though obviously of larger masses than individual wires, were also aligned and attached to the substrate. With a further reduction in wire concentration to 3.9×10$^7$/ml, chaining effect was almost absent as shown in FIG. 8.

In addition to singularity as discussed above, concentration of the wires may also affect the spatial distribution of the wires. In terms of the spacing/height ratio of the arrays, the very high concentration shown in FIG. 6 undoubtedly fails the criteria of spacing/height ratio of 2 as required for an efficient emitter. With a reduction of concentration to 7.8×10$^7$/ml as shown in FIG. 7, spacing between wires was in the range of ~23-25 um giving a ratio of ~2.3-2.5 with 10 um tall wires. It was a vast improvement over the highly congested array in FIG. 6 but chaining effect was still evident though much reduced. With further reduction in concentration to ~3.9×10$^7$/ml as shown in FIG. 8, a rather non-uniform spatial distribution was obtained with some spacing reaching as small as 8 um but some reaching as high as 22 um. Though chaining and large aggregates of wires were almost absent, generally the wires seemed to be too scarcely distributed. For example, to achieve a compromise between a spacing/height ratio similar to that mentioned above and minimum chaining and aggregation, a concentration of between 10$^7$/ml and 3.1×10$^8$/ml, between 3.9×10$^7$/ml and 7.8×10$^7$/ml such as equal to or below 6.0×10$^7$/ml may be used.

Figure 10:
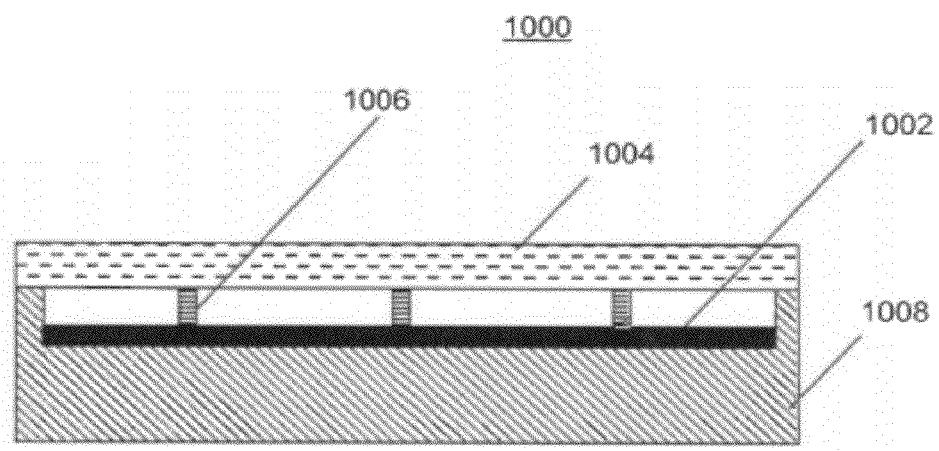
FIG. 10 is a cross sectional diagram of a Field Emission Display (FED) or multi-segmented backlight for a LCD.

Referring to FIG. 10, the principle of a Field Emission Display (FED) or multi-segmented backlight for LCD 1000 is shown, including an emitter array 1002 and a phosphor coated screen 1004 in a housing 1008. The phosphor coated screen 1004 is parallel to the emitter array 1002 and spaced apart from it by a series of spacers 1006. The cavity surrounded by the housing 1008 and the screen 1004 is maintained under vacuum. The phosphor coated screen 1004 consists of a glass face plate, a phosphor layer and an anode layer. The accelerated electrons from the emitter array 1002 collide against the phosphor coated screen 1004 and fluorescent light is generated.

Whilst exemplary embodiments of the invention have been described in detail, many variations are possible within the scope of the invention as will be clear to a skilled reader.

The invention claimed is:

1. A field effect electron emitting apparatus comprising:
   a substrate;
   a plurality of wires extending generally perpendicularly with respect to the substrate and including magnetic material; and
   a metal layer disposed on the substrate and at a base of the wires to hold the wires on the substrate and perpendicularly thereto,
   wherein an average wire spacing is less than 30 μm, an average spacing height ratio is between 1 and 3 and an average wire aspect ratio is greater than 3.

2. The apparatus according to claim 1, wherein an average length of the plurality of wires is less than 10 μm.

3. The apparatus according to claim 1, wherein an average diameter of the plurality of wires is less than 3 μm.

4. The apparatus according to claim 1, further comprising:
   an insulating layer on or adjacent to a cathode and having an array of pores; and
   one or more gate electrodes on top of said insulating layer.

5. The apparatus according to claim 4, wherein each wire has a tip furthest from the substrate substantially co-planar with the gate electrodes.

6. The apparatus according to claim 1, wherein each of the plurality of wires is composed of at least one or more of: Ni, Fe and Co.

7. The apparatus according to claim 1, further comprising:
   a plurality of cathodes, the plurality of wires being partitioned into regions, each region being in electrical contact with a respective cathode.

8. A field effect display comprising:
   a field effect electron emitting apparatus according to claims 1; and
   a phosphor coated screen parallel to the substrate of the field effect electron emitting apparatus, the screen being provided with one or more anodes.

9. An illumination apparatus comprising:
   a field effect electron emitting apparatus according to claims 1; and
   a phosphor coated screen parallel to the substrate of the field effect electron emitting apparatus, the screen being provided with one or more anodes.

10. A backlight apparatus for a liquid crystal display comprising:
    a field effect electron emitting apparatus according to claim 1; and
    a phosphor coated screen parallel to the substrate of the field effect electron emitting apparatus, the screen being provided with one or more anodes, the one or more anodes being provided with electronic circuitry for powering them as a plurality of independently operable segments.

11. The field effect electron emitting apparatus according to claim 1, wherein the plurality of wires are nickel (Ni) wires.

12. The field effect electron emitting apparatus according to claim 1, wherein the substrate is a glass substrate with a gold (Au) seed layer.

13. The field effect electron emitting apparatus according to claim 1, wherein the metal layer is a nickel (Ni) film.

* * * * *